(12) United States Patent
Wijaya et al.

(10) Patent No.: US 12,094,180 B2
(45) Date of Patent: Sep. 17, 2024

(54) METHOD FOR DEVELOPING MACHINE-LEARNING BASED TOOL

(71) Applicant: PANASONIC INTELLECTUAL PROPERTY MANAGEMENT CO., LTD., Osaka (JP)

(72) Inventors: Chandra Suwandi Wijaya, Singapore (SG); Ariel Beck, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1017 days.

(21) Appl. No.: 17/063,923

(22) Filed: Oct. 6, 2020

(65) Prior Publication Data

US 2022/0108210 A1 Apr. 7, 2022

(51) Int. Cl.
| | |
|---|---|
| G06N 20/00 | (2019.01) |
| G06F 11/34 | (2006.01) |
| G06F 18/214 | (2023.01) |
| G06F 18/231 | (2023.01) |
| G06V 10/25 | (2022.01) |
| G06V 10/40 | (2022.01) |

(52) U.S. Cl.
CPC .......... *G06V 10/25* (2022.01); *G06F 11/3409* (2013.01); *G06F 18/214* (2023.01); *G06F 18/231* (2023.01); *G06N 20/00* (2019.01); *G06V 10/40* (2022.01)

(58) Field of Classification Search
None
See application file for complete search history.

(56) References Cited

FOREIGN PATENT DOCUMENTS

| CN | 113646805 A | * | 11/2021 | ............... A61B 3/00 |
| WO | WO-2013052824 A1 | * | 4/2013 | ......... G06K 9/00127 |

OTHER PUBLICATIONS

Remiszewski (Year: 2013).*
Li (Year: 2021).*

* cited by examiner

*Primary Examiner* — David R Vincent
(74) *Attorney, Agent, or Firm* — Rimon P.C.

(57) ABSTRACT

The present subject matter refers a method for developing machine-learning (ML) based tool. The method comprises initializing an input dataset for undergoing ML based processing. The input dataset is pre-processed by a first model to harmonize features across the dataset. Thereafter, the dataset is annotated by a second model to define a labelled data set. A plurality of features are extracted with respect to the data set through a feature extractor. A selection of at-least a machine-learning classifier is received through an ML training module to operate upon the extracted features and classify the dataset with respect to one or more labels. A meta controller communicated with one or more of the first model, the second model, the feature extractor and the selected classifier for assessing a performance of at least one of first model and the feature extractor, a comparison of operation among the one or more selected classifier, and diagnosis of an unexpected operation with respect to one or more of the first model, the feature extractor and the selected classifier.

16 Claims, 13 Drawing Sheets

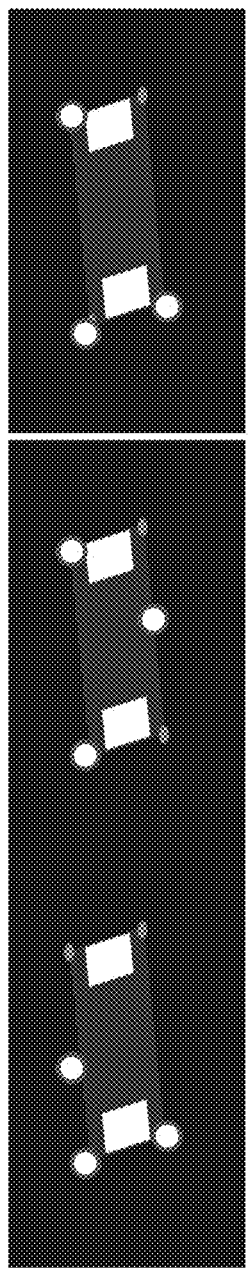
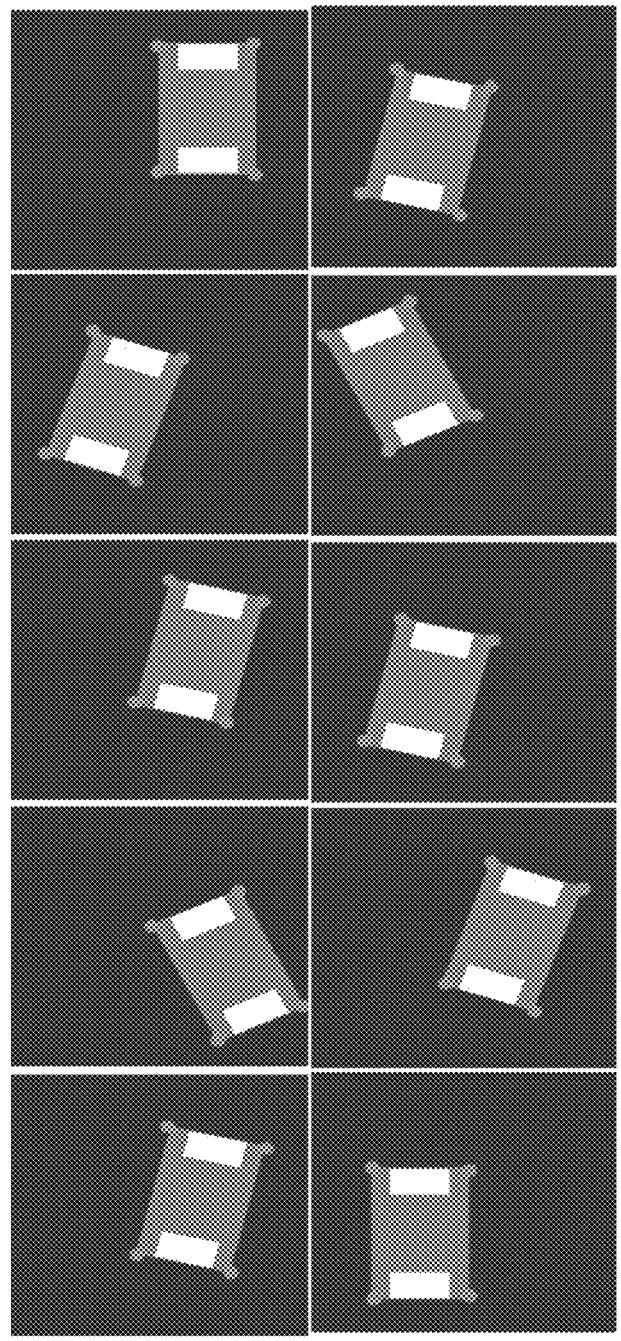
Fig. 5

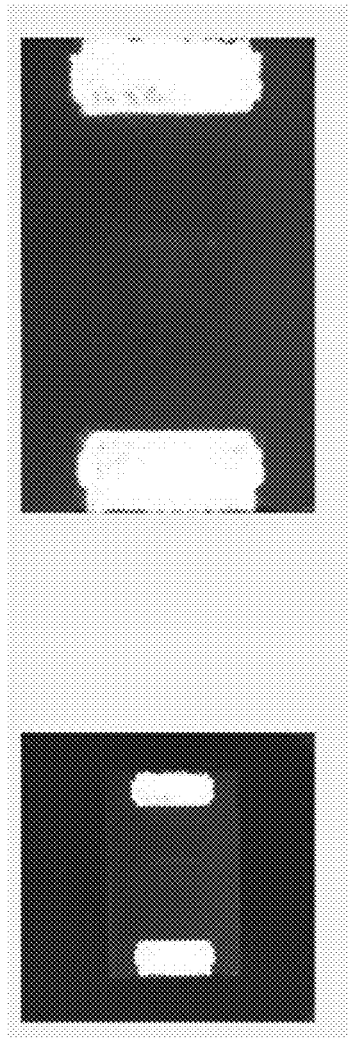
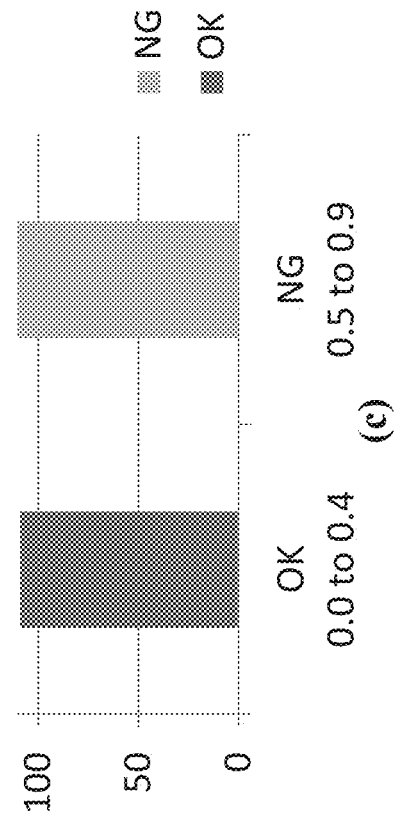
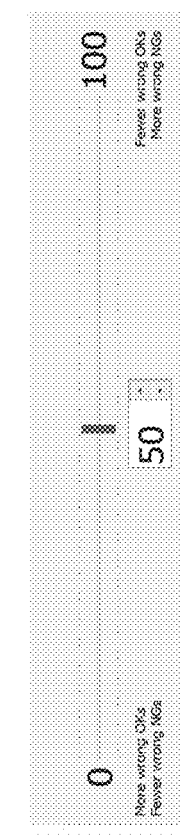
Fig. 8

Model performance:
POOR (a)
Recommended Actions:
The selected ROI are not appropriate for such defects
(f)
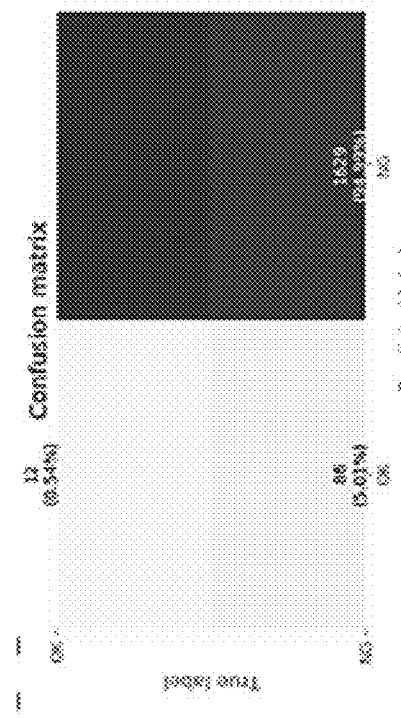
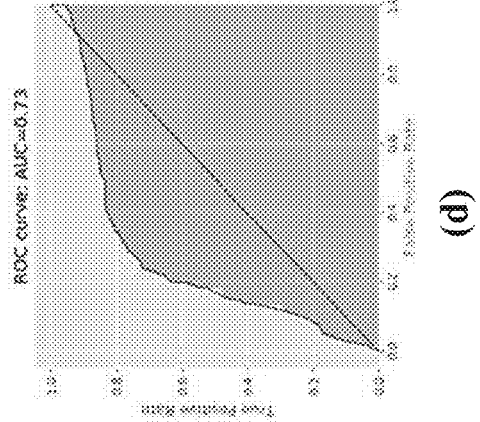
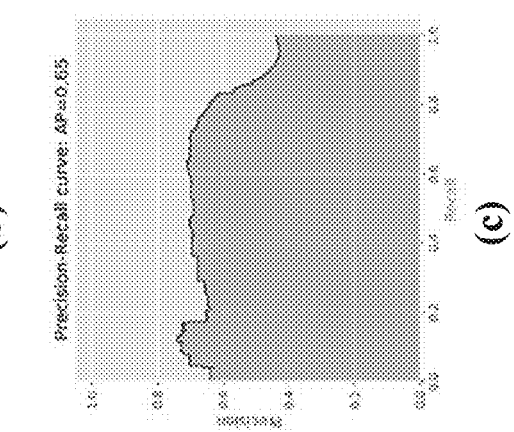
Fig. 11

METHOD FOR DEVELOPING MACHINE-LEARNING BASED TOOL

TECHNICAL FIELD

The present invention generally relates to multimedia data classification, specifically towards creating a machine-learning (ML) based model for said classification.

BACKGROUND

Of late, it is getting increasingly necessary to achieve artificial intelligence driven solutions and programs such as AI driven visual-inspection mechanisms to be more easily accessible and faster to develop. This demand at least stems from strain and constraints associated with manpower resources during project based development. As shown in the FIG. 1A, a typical process-flow involves receipt of project-request and deputation of engineer or professional. Thereafter, the AI visual inspection model is developed and resulting code is deployed.

As shown in FIG. 1B, development of customized-solution of an example AI visual inspection development activity is performed under diverse phases of a project. The diverse phases correspond to modules that are sequentially linked, i.e. initialization of input dataset, annotation of data set, alignment of input data set, feature extraction, ML training, etc. As indicated in FIG. 1A, based on separate timelines associated with each module, a typical time duration expended to render AI algorithm is 2-3 months.

At least a reason as may be attributed to such long timeline is nature of customization. In absence of any unified and universal source code, a final developed AI model becomes diversified as it undergoes various stage of development in the pipeline as depicted in FIG. 1B. Accordingly, the overall development through the pipeline is substantially slow going by the current industry standards, which in turn constrains the manpower by maintaining them engaged over the same tasks for a long period of time and in turn adversely affects the organization's growth and expansion plans.

More specifically, owing to such timelines based constraints posed due to customization and project based service, a mass production of models is in turn constrained. In an example, the manpower entrusted for developing the AI model also needs to be routed to render after service support to troubleshoot the anomalies and discrepancies. Accordingly, the current timelines usually keep the workforce bound to a same AI model for a long time and thereby adversely affect the timing of development of forthcoming models.

There lies at least a need to improvise the process at modular level by at least detecting the weaker links in the pipeline beforehand and troubleshoot the problem with time efficiency.

There lies at least a need to expedite the process at the granular level in the pipeline to achieve an overall time efficiency and an optimized allocation of workforce to execute the AI model development.

There lies at least a need to test performance of the modules in the pipeline during the course of AI model development to enable a beforehand adoption of safeguards.

Last but not the least, there lies a need for enabling a regular engineer to creating and generating an AI model which otherwise requires specific techniques, expertise, and know how to fine tune and adjust the parameters to have AI model with high quality.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting or classifying a condition of any material or object or any feature/attribute related to the material/object either in a fully automated environment or through a semi-automatic mechanism that involves external feedback from a living-being (operator) in the environment.

The present subject matter refers a method for developing machine-learning (ML) based tool. The method comprises initializing an input dataset for undergoing ML based processing. The input dataset is pre-processed by a first model to harmonize features across the dataset. Thereafter, the dataset is annotated by a second model to define a labelled data set. A plurality of features are extracted with respect to the data set through a feature extractor. A selection of at-least a machine-learning classifier is received through an ML training module to operate upon the extracted features and classify the dataset with respect to one or more labels. A meta controller communicated with one or more of the first model, the second model, the feature extractor and the selected classifier for assessing a performance of at least one of first model and the feature extractor, a comparison of operation among the one or more selected classifier, and diagnosis of an unexpected operation with respect to one or more of the first model, the feature extractor and the selected classifier.

In other embodiment, the present subject matter refers a method for developing machine-learning (ML) based tool. The method comprises initializing a dataset for undergoing ML based processing. The data set may be preprocessed by a first model to harmonize features across the dataset. Thereafter, the data set is annotated by a second model to define a labelled data set. Optionally, a plurality of features may be extracted with respect to the data set through a feature extractor. A selection of a machine-learning (ML) classifier is received through an ML training module to operate upon the extracted features and classify the dataset with respect to one or more labels. A meta controller communicates with one or more of the first model, the second model, the feature extractor and the selected classifier for assessing a performance of at least one of first model and the feature extractor, a comparison of operation among the one or more selected classifier; and diagnosis of an unexpected operation with respect to one or more of the first model, the feature extractor and the selected classifier.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 5 illustrates an example implementation of alignment GUI and dataset, in accordance with another embodiment of the present disclosure:

FIG. 8 illustrates example GUI with respect to a performance review for a selected ML model, in accordance with another embodiment of the present disclosure;

FIG. 11 illustrates an example overall performance report, in accordance with another embodiment of the present disclosure;

Figure 1A:
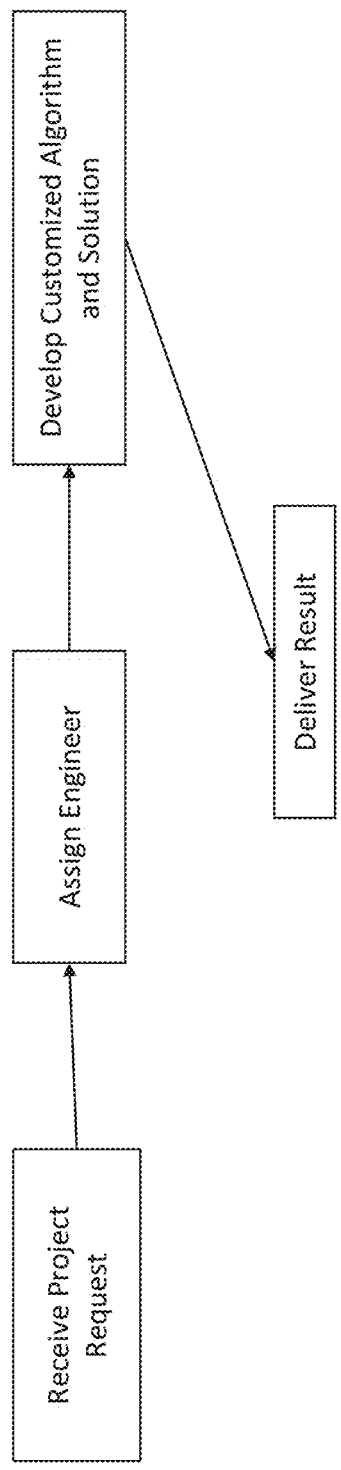
FIGS. 1A and 1B illustrate a state of the art scenario.
Figure 1B:
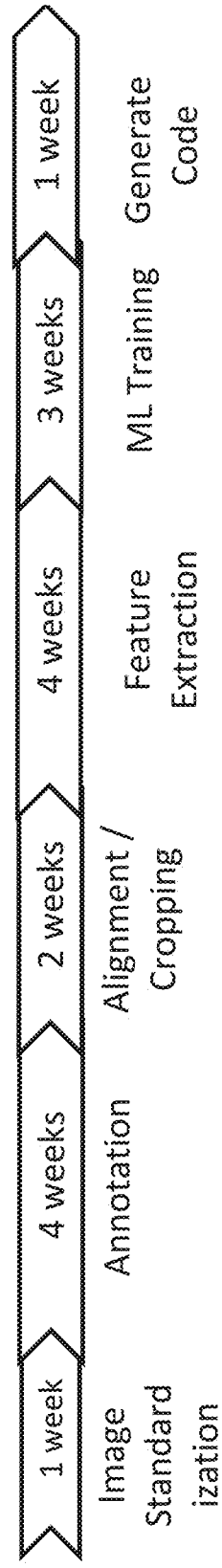

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present subject matter are described below in detail with reference to the accompanying drawings.

Figure 2:
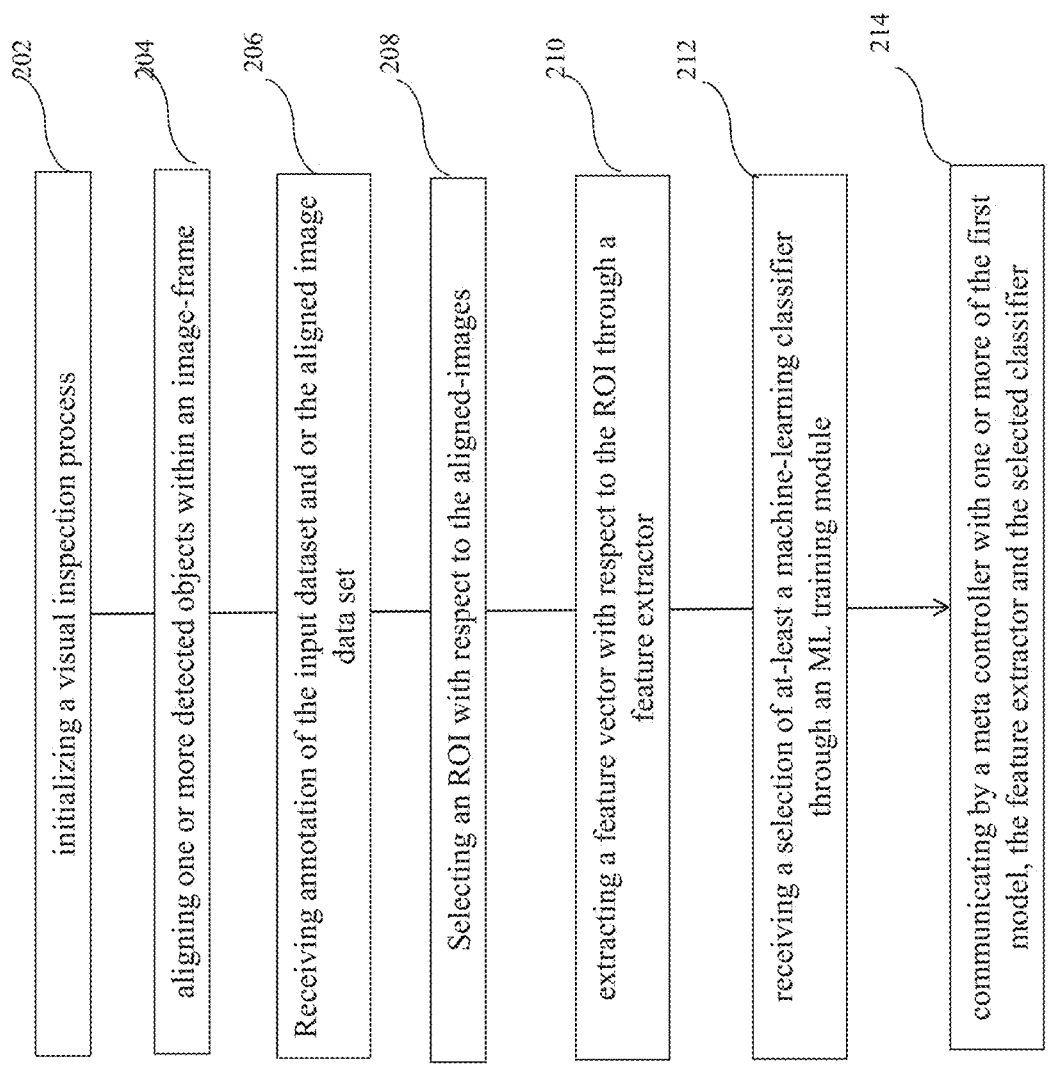
FIG. 2 illustrates method steps in accordance with the embodiment of the present disclosure.

FIG. 2 illustrates a method for developing machine-learning (ML) based tool for visual inspection. The method comprises initializing (step 202) a visual-inspection process based on one or more selected image defining a dataset. The initialization (step 202) comprises operating upon a GUI by a user for receiving high-level inputs defined by one or more of a path to dataset, data labelling, classes, and a type of problems to be solved through the visual-inspection.

Further, the method comprises aligning (204) one or more detected objects within an image-frame in relation to said at least one image based on a first model or an alignment model to generate at-least one aligned image. The alignment through the first model comprises modifying a position of the detected object of the image within an image-frame. The alignment may be defined by a GUI based operation for rendering a semi-automated alignment process or in other words a user-operable tool for a manual/semi-automatic image-alignment. In other example, an auto-alignment tool may be provided.

Optionally, a user-defined or an automatically defined annotation may be received (step 206) through a GUI based annotation-tool in respect of the aligned images or the input data set. The GUI based annotation-tool may be defined by a first area for depicting a labelled data set through a dendrogram with respect to the aligned images. A second area comprises a plurality of controls associated with approving and/or relabeling the labelled set.

In other embodiment, the method further optionally comprises defining (step 208) a region of interest (ROI) with respect to the aligned image through a second model which may be a ROI model. The ROI may be automatically selected or manually-selected.

Based thereupon, the method further comprises extracting (step 210) a plurality of features with respect to the ROI in the aligned-images through a feature extractor for providing a feature-vector for the ML training module. In other words, a plurality of features is extracted with respect to the ROI in the aligned images. In other example, wherein ROI is not contemplated, the features may be directly fetched with respect to the aligned images. Moreover, the selected ROI may be assessed by an in-built ROI check within the second model for assessment of performance and diagnosis with respect to the selection of the ROI.

Further, the method comprises receiving (step 212) a selection of at-least a machine-learning classifier or a deep learning architecture through an ML training module to operate upon the either the extracted features and classify the at least one image with respect to one or more labels pre-defined under a visual-inspection. The receipt of the selection of the at-least one machine-learning classifier through the ML training module further comprises selecting a machine learning classifier and/optionally a cross validation method based on the user input received through a GUI forming a part of the ML training module.

Further, the method comprises communicating (step 214) by a meta controller with one or more of the first model, second model, annotation tool, the feature extractor and the selected classifier for drawing assessment. As a part of assessment, various type of analytical assessment may be drawn in terms of: a performance of at least one of first model and the feature extractor, a comparison of operation among the one or more selected classifier, and diagnosis of an unexpected operation with respect to one or more of the first model, the feature extractor and the selected classifier.

In an example, the assessment of the performance by the metacontroller further comprises generating a statistical-report for each of first model, second model, feature extractor and the one or more selected classifier, said statistical report based on metrics defined by one or more of, accuracy, recall, precision, computation time and any function based upon a combination thereof. Said report may be referred to detect an underperforming or high resource consuming entity from amongst the first model, second model, feature extractor and the one or more selected classifier. Thereafter, the malfunctioning or underperformance caused due to said detected entity may be addressed by prompting an automatic or user-defined corrective action.

In yet another example, the assessment of the performance by the metacontroller further comprises performing an automatic or semi-automatic A/B testing based on observing a change in configuration with respect to a visual-inspection pipeline having stages as one or more of the first model, second model, feature extractor and the ML training module. Such assessment may be defined by triggering the one or more of said stages in the pipeline to share respective operation details. Based on the received operation related details, the metacontroller renders a diagnostic tool to check malfunctioning at every stage in the pipeline. In other example, the automatic or semi-automatic A/B testing may be enabled in batch mode by allowing a selection amongst various operational parameters at every stage in the pipeline.

Finally, a finalized AI powered model for the visual inspection process may be generated on-field to execute a machine-learning driven based inference process for visual inspection, said code having been generated upon assessment of the performance. Prior to deployment, the metacontroller can generate different versions of the deployment code (for instance C language and/or Python based) for further A/B tests and accordingly deploy a better performing model.

Figure 3:
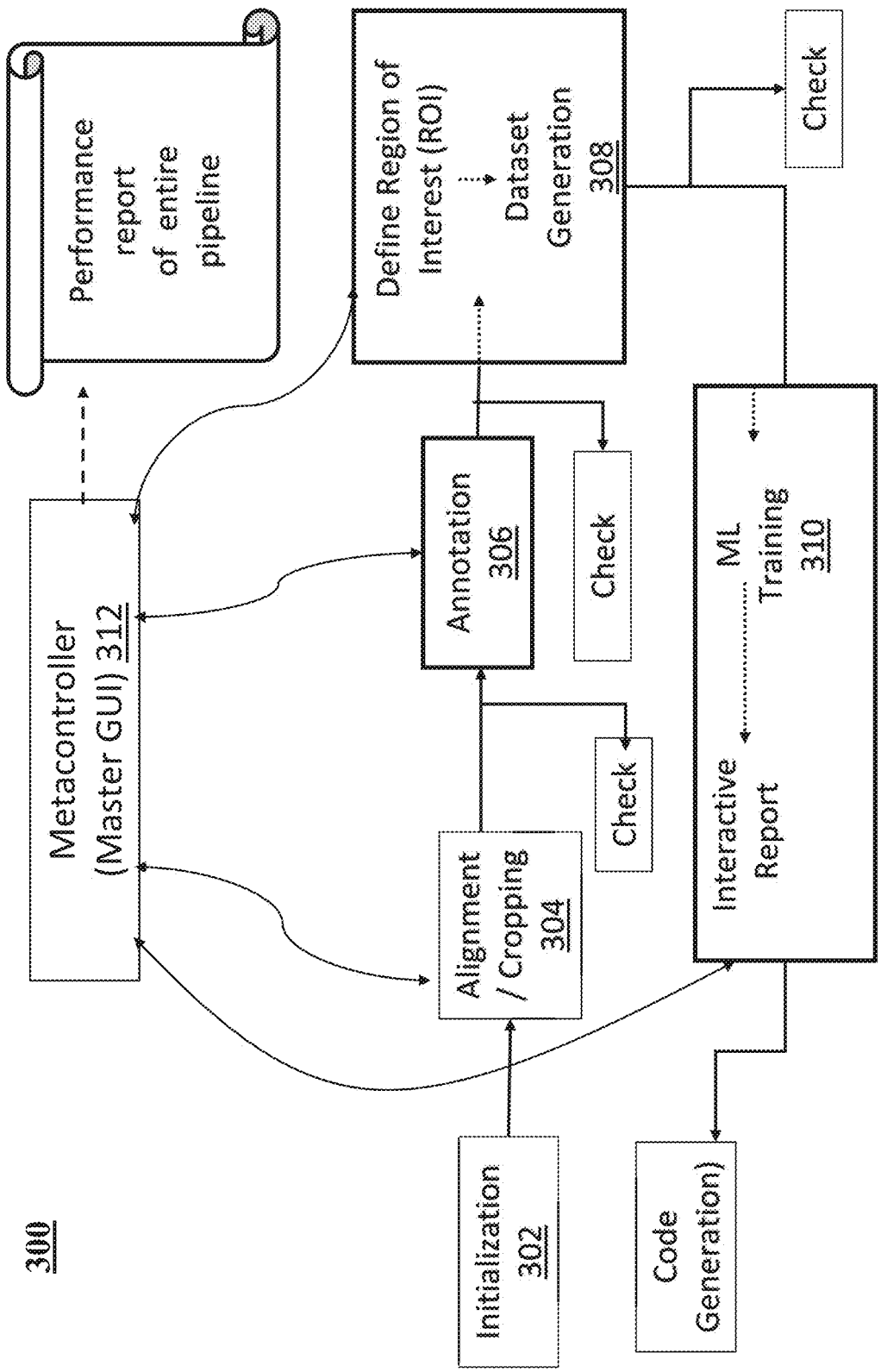
FIG. 3 illustrates a system architecture based on the method of FIG. 2, in accordance with an embodiment of the present disclosure.

FIG. 3 illustrates a schematic-architecture or a system 300 for developing machine-leaning (ML) based tool for visual inspection in a computing environment. The system 300 comprises an initialization module 302 for step 202, an alignment module 304 for step 204, an annotation tool 306 for step 206, a ROI selector 308 for step 208 and 210, an ML training module selector 310 for step 212 and a metacontroller 312 for managing the execution of the steps 202 until 214 of FIG. 2. Each of said module may be provided with a communication-interface and GUI for executing the method steps based on a user-provided input or trigger.

Each of the module (e.g. Alignment. Annotation, Etc.) may have their respective internal-functions that correspond to its own task and role to perform specific action within a pipeline of the visual inspection process. In an example, the alignment method aligns images, annotation tool is used to label data, and so on. In an example, each module may utilize proprietary technology and is designed to be automated/semi-automated to assist with a user. Such internal functioning may be controlled by individual-controllers, models and respective user-interfaces, that are in turn controlled and orchestrated by the Metacontroller 312.

Further, for each of the module, upon completion of action, the system 300 will also generate a performance report based on statistical calculation to assess how well the module perform its task (e.g. how well the system does the alignment, etc.). While each module may have different method for calculation, but it will still be based on statistical analysis. This performance report is shared and reported back to metacontroller 312 to keep track of module performance. As an example, the Machine Learning module 310 reports performance in terms of metrics such as Accuracy, recall, precision and so on as well as computation time.

Further, each module has its own performance report. If the final performance report rendered by the metacontroller 312 is not satisfactory, the metacontroller 312 may pull and refer the entire performance report along the pipeline (modules 302 until 310 and 314) to diagnose and detect as to which step/module is underperforming (the weakest link) and report this to the user to take specific corrective action or pursue a recommended corrective action. This can be done to speed up inference as well by pointing out which component/module is computationally expensive.

Further, as a part of conducting A/B testing, the metacontroller 312 accesses entire information pertaining to each module (302 until 310 and 314) and conducts performance of the testing if a specific module configuration is changed. In an example, the metacontroller 312 can draw performance comparisons in respect of user-selected alignment method with some other alignment method. i.e. Alignment method A compared to alignment method B, etc. At least a benefit is that A/B testing may be conducted while considering the full pipeline 302 until 310 and 314 not just the individual performance.

Figure 4:
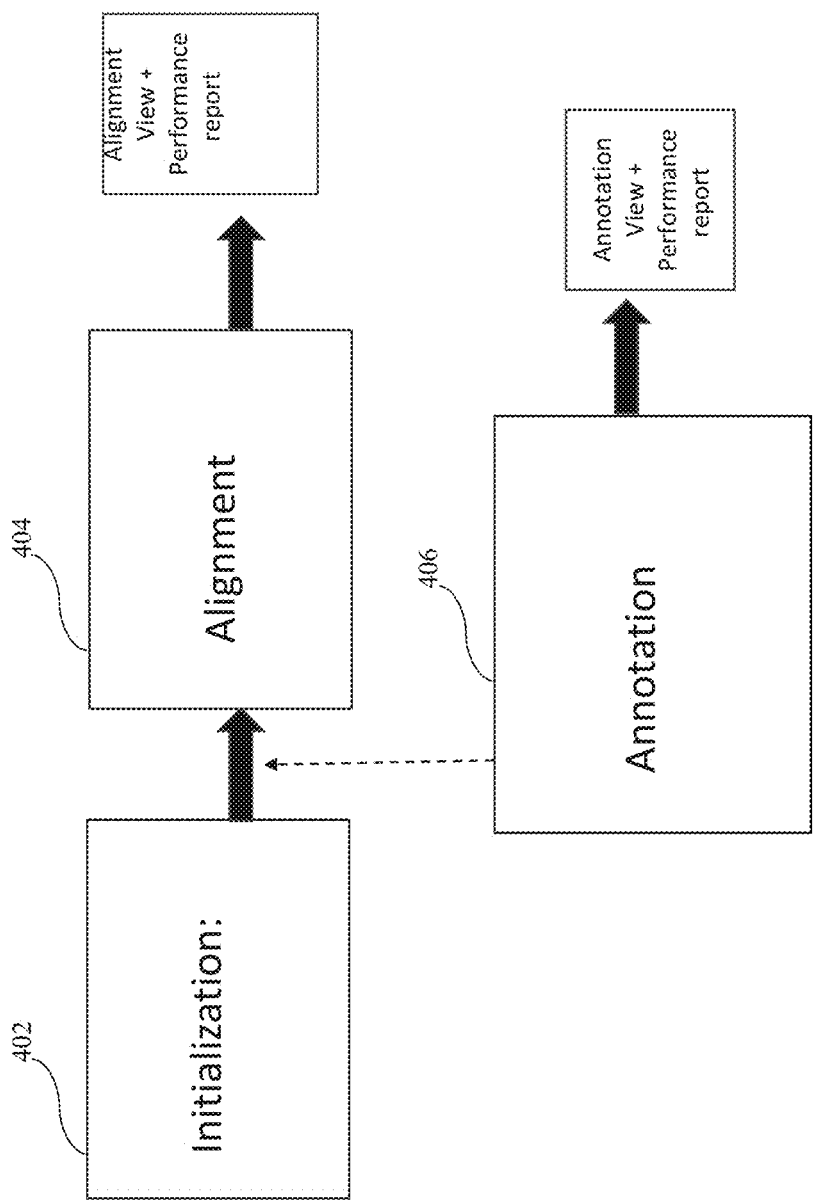
FIG. 4 illustrates an example implementation of method steps of FIG. 2, in accordance with another embodiment of the present disclosure.

FIG. 4 illustrates example process steps initialization and alignment-models for facilitating image-inspection.

At step 402, which corresponds to initialization or step 202, a GUI may be provided to initiate process. Through the present step 402, a high level information as a part of initial configuration is passed along to next-step in pipeline. As a matter of rendering high level information, the user may provide path to dataset, data labelling, classes, type of problems to be solved. More specifically, the operator indicates data path, labels and type of problem e.g. binary vs multiclass vs clustering. In an example, the present step 402 may be defined under following sub-steps:

A) Define folder paths.
B) Initiate the process.
C) Check Image Distribution.
D) Choose Image standardization method as a part of image pre-processing for visual inspection At step 404 which corresponds to initialization or step 202, a semi-automatic or fully automatic alignment method may be chosen by the operator to align and check alignment of input images. An auto-alignment checking tool may be provided to evaluate the alignment as Ok or Not OK. The user can also select multiple options for A/B testing among the applicable alignment methods. Thereafter, the aligned dataset is passed along to next step in pipeline.

Figure 6:
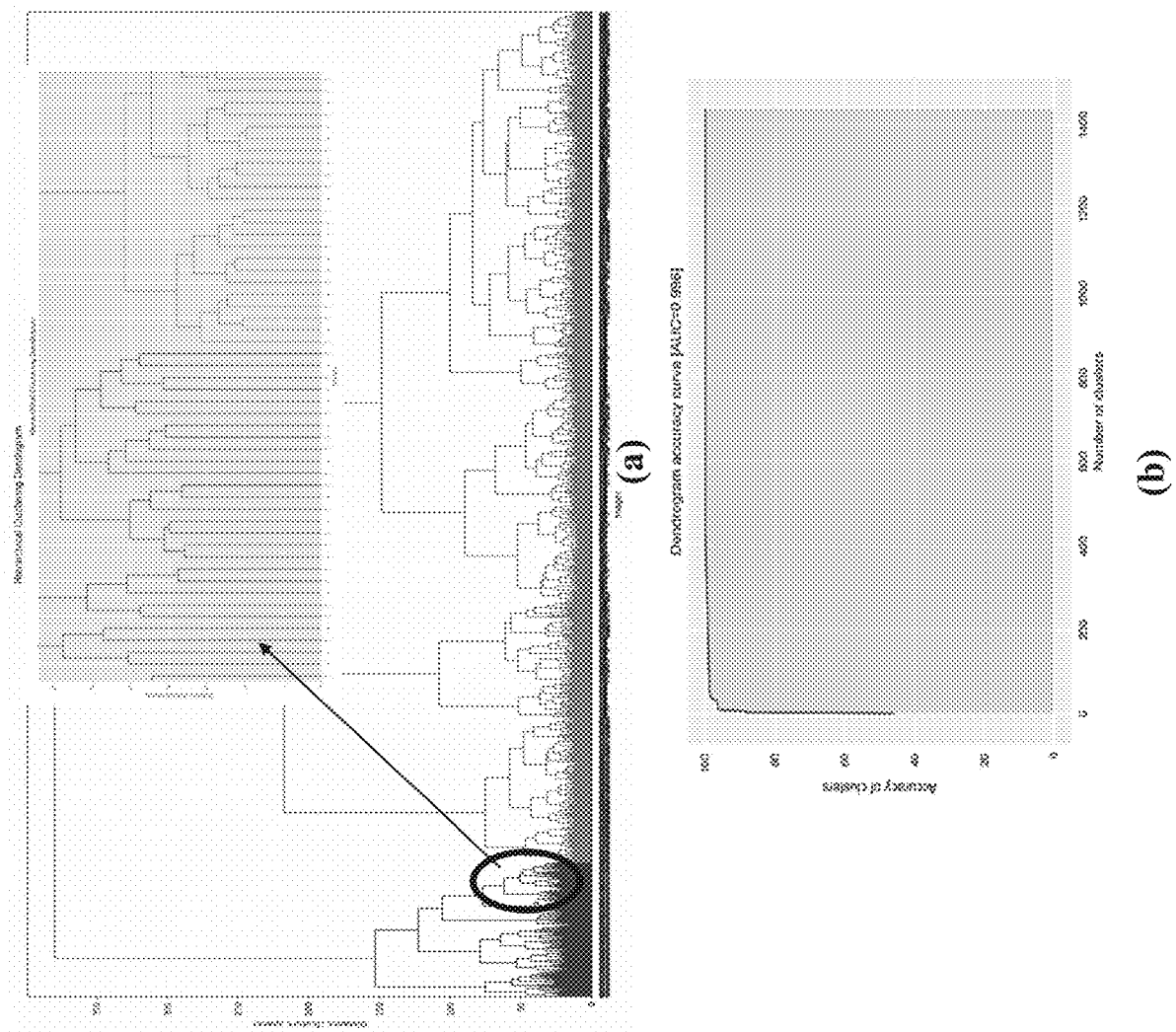
FIG. 6 illustrates another example implementation of an annotation tool, in accordance with another embodiment of the present disclosure.

As a part of optional step 406 which corresponds to step 206, labelling of aligned image from the step 404 or the input data set from step 402 may be performed using a graphical tree representation such as dendogram (as depicted in FIG. 6). More specifically, the present step 406 receives path to aligned dataset from step 404, prior information about classes from step 402, and accordingly sends labelled dataset and performance results.

Each of the steps 404 and 406 also render a performance report for review and operation by the operator or user.

FIG. 5 illustrates an example of semi-automatic image alignment process has been corresponding to step 404. The same refers a general purpose alignment-tool to align any type of object. As shown in FIG. 5*a*, the user only needs to annotate small number of images (for instance 3 figures) by choosing specific landmark points. As shown in FIG. 5*b*, the annotation tool will start data augmentation e.g. by rotating, shifting, and changing the aspect ratio of object, and generate a plurality of images (for instance 20 impressions) to train deep learning model. An output image may undergo image alignment quality check and may be categorized as OK to proceed or not good enough. ( In another example, Template Matching may be used as a general purpose alignment tool to align any type of object. In an example, user may only need to annotate single object. The annotation tool will check new input image, find similar pattern, and align the new image in accordance to the annotated image.

FIG. 6 refers an annotation tool in accordance with the step 406. The annotation tool facilitates one or more of a user-defined or automatically defined annotation in respect of the aligned images or the input images. As indicated in FIG. 6, the annotation tool utilizes clustering technology to construct dendrogram for Image annotation. Accordingly, the tool comprises a first area for depicting a labelled data set through a dendrogram with respect to the aligned images. Another part of a GUI representing the annotation tool comprises a plurality of controls associated with approving and/or relabeling the labelled set. FIG. 6(*b*) represents annotation checking wherein checks and accuracy testing are done with Assessment of Area under the curve.

However, the present annotation in FIG. 6 can be considered optional and may not be required in a scenario wherein the input dataset comes pre-annotated.

Figure 7:
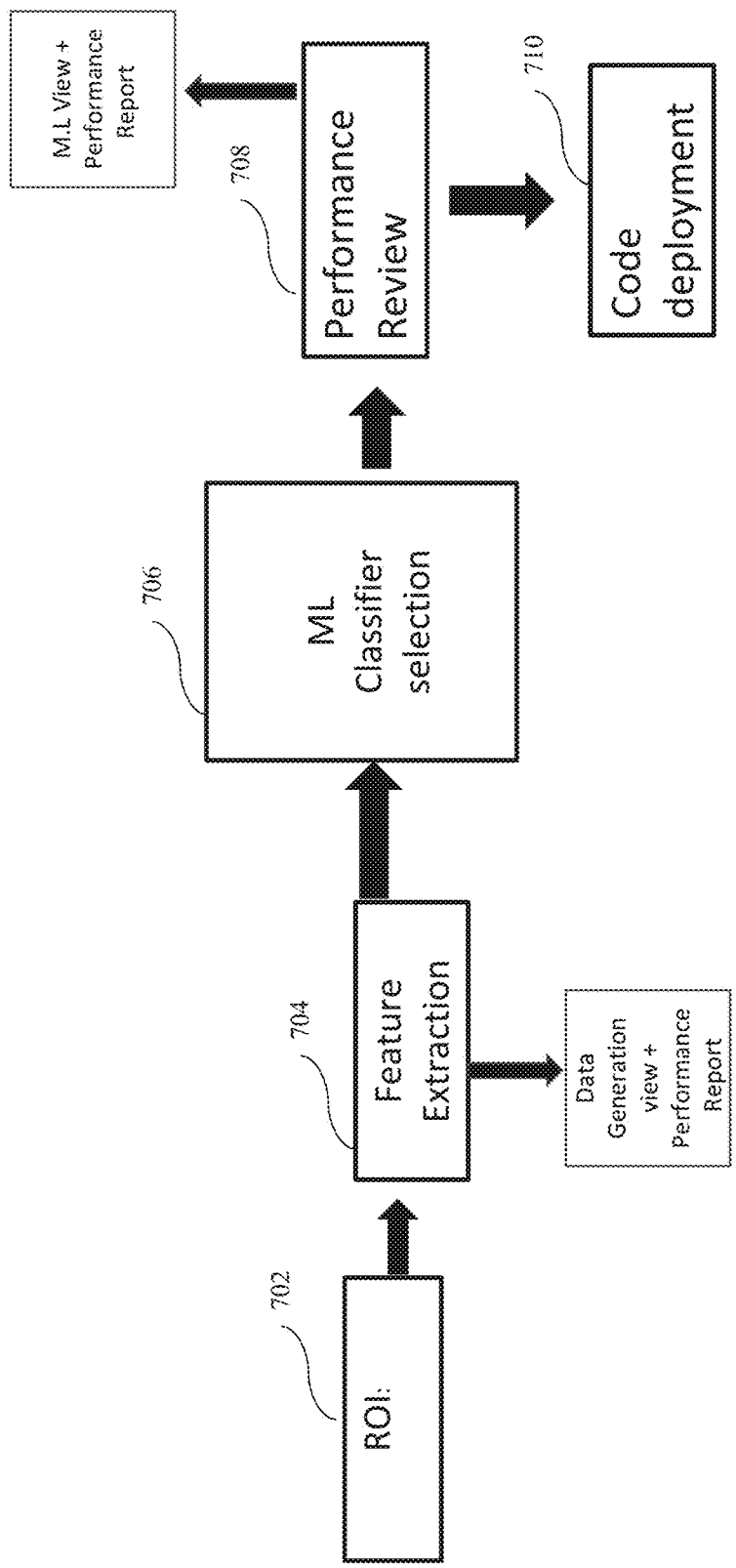
FIG. 7 illustrates an example implementation of method steps of FIG. 2, in accordance with another embodiment of the present disclosure.

FIG. 7 represents an ROI selector and feature extractor corresponding to steps 208 and to 214.

At step 702 which corresponds to step 208, the user selects region of interest (ROI) via manual or automated system and accordingly a specific output is rendered as ROI information which is passed along to next step in the pipeline. Specifically, either the operator selects the ROI or an automatically proposed ROI is rendered. The ROI selector essentially receives path to aligned dataset, labels and sends selected ROI extracted features as a feature vector vide step 704.

At step 704 which corresponds to step 210, Feature Extraction/data set generation takes place. A list of features from the ROI may be generated for machine learning as a part of classic AI based machine learning criteria. Accordingly, the extracted features are passed along to next step in pipeline. As a part of performance report, the distribution of features as extracted may be compared between OK and Not Good (NG). In an example, a performance notification may be rendered as to whether selected ROI is fit or unfit for usage.

However, in case of deep learning architecture, the present step 704 may be optional and ROI (whether manually or automatically selected) may be directly sent to the next stage in pipeline At step 706 which corresponds to step 212, as a part of Machine Learning or Deep Learning model selection, the user uses GUI to choose classifier and cross validation method. Accordingly, the selected model and performance are passed as output to next stage in the pipeline. As a part of reviewing performance, the user uses a GUI to preview result and expected performance. As a part of present step 706, the input is received as dataset, performance reports from all previous steps In step 708 which corresponds to step 212, as a part of reviewing performance of the selected ML model, the Operator selects the models to be tested or receives a recommendation as to which models are appropriate. In an example, the operator may receive a recommendation of Brute Force testing with respect to a particular ML model or two, or altogether a recommendation to select a particular model or two. The operator can perform A/B testing based on the current selected ML model and the previous option In step 710 which corresponds to step 214, after reviewing interactive report in step 708, the user can then choose the specific configuration through the GUI and then generate the code for deployment. In an example, the code may be deployed in python or may be converted into C++ platform for deployment.

FIG. 8 illustrates a GUI as a part of performance review depicted in step 708. As depicted in FIG. 8(*a*), the operator may review a categorization of aligned image as OK or NOT OK. A control may be provided to set the threshold with respect to the category OK and NOT OK vide FIG. 8(*d*). Further, a confusion matrix may be provided vide FIG. 8(*b*) to yield the classification and misclassification results with respect to the selected model. In other example, the classification results may be depicted through misclassification curve. Further, a distribution may be provided vide FIG. 8(*c*) in terms of histogram for depicting the total number of aligned image samples deemed as OK and not Ok.

Figure 9:
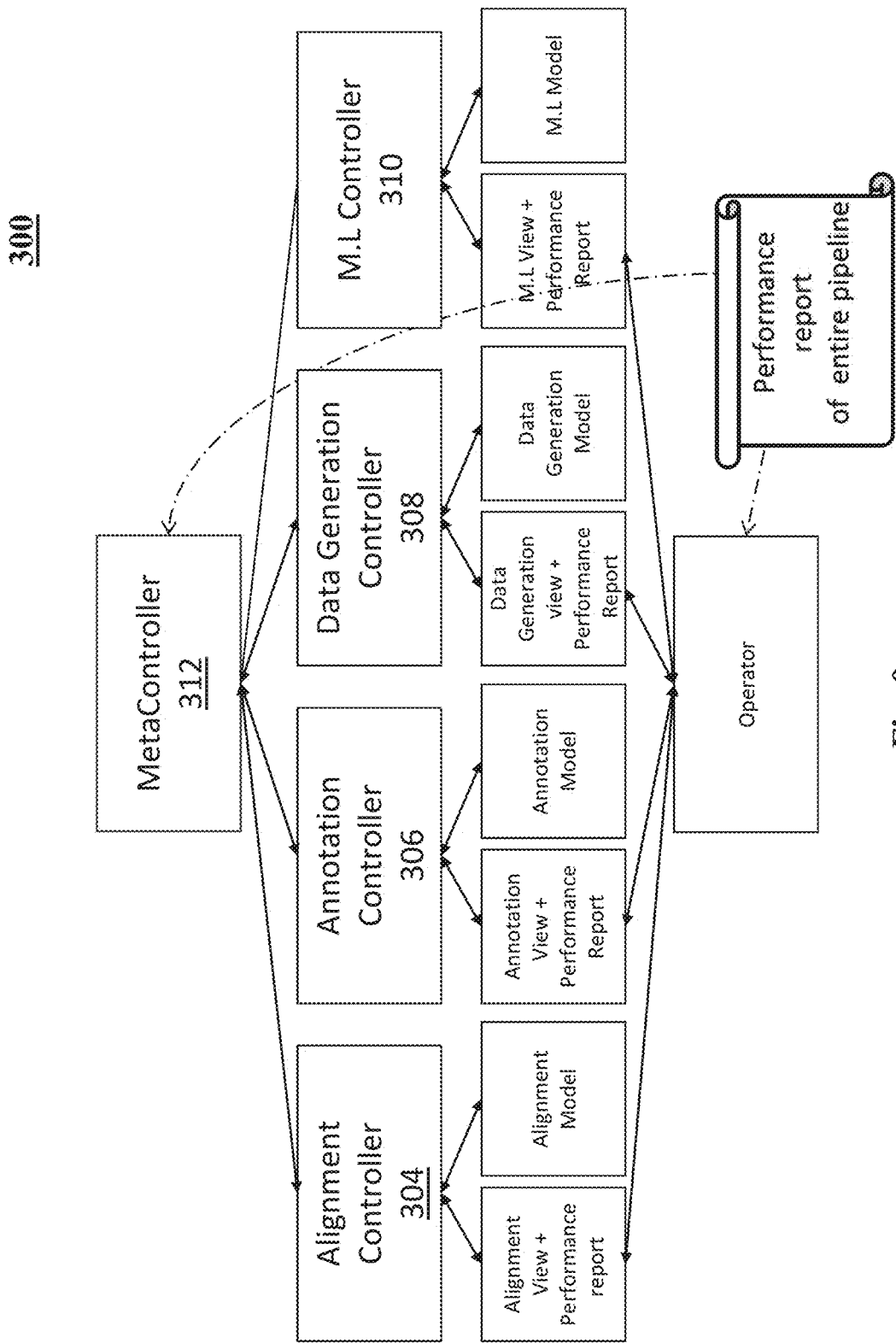
FIG. 9 illustrates an example architecture with respect to the architecture depicted in FIG. 3, in accordance with another embodiment of the present disclosure.

FIG. 9 illustrates an example-architecture with respect to the architecture depicted in FIG. 3, in accordance with another embodiment of the present disclosure. As depicted in figure, the metacontroller 312 is connected to each component 304, 306, 308 and 310 to fine tune and adjust the parameters to have the final AI model with high-quality. The metacontroller 312 renders a central communication system that keep an overview of the full system 300 and lead an operator user at each module 304, 306, 308 and 310

Each of the module 304, 306, 308 and 310 share their internal-functioning and performance report with the metacontroller 312. The same as least facilitates diagnostic tools as a part of the GUI depicted in FIG. 8 at the module 308 corresponding to the selection of the M.L stage. Diagnostics are carried out by assessing performance of each module which is reported back to the controller 312 for compilation and displayed within the views as rendered in forthcoming FIG. 10 and FIG. 11 and input.

When operator make changes/adjustment on each module, the controller 312 can perform A/B Testing as it keeps track of each model performance from each module. In other words, a semi-automatic A/B testing with respect to the alignment methods, clusters, ROI features, the selected ML models or deep learning architectures is facilitated at the respective stages 304, 306, 308 and 310. Accordingly, the user or an operator is allowed to easily test different options at each step through A/B testing and thereby test different pipelines and models.

The operator need not have Machine Learning expertise to control the system 300. The system 300 and metacontroller 312 leads the operator through the various steps and options. Accordingly, the operator and system 300 collaborate to build a best possible model with time efficiency.

Overall, the metacontroller 312 orchestrates a sequential flow of the overall interaction since not all the components are functional everytime. The metacontroller 312 stores the information that needs to be shared across different components (system control flow, various options to be exercised at every module. M.L models to be selected and so on), and allows saving current status, system interruption and re-loading components. Last but not the least, the metacontroller 312 analyses the performance reports (both overall and module-wise) and proposes improvements to the user for troubleshooting. In an example, the metacontroller may suggest change to the selected ROI upon diagnosing a wrong selected ROI at the ROI selector stage 306.

Figure 10:
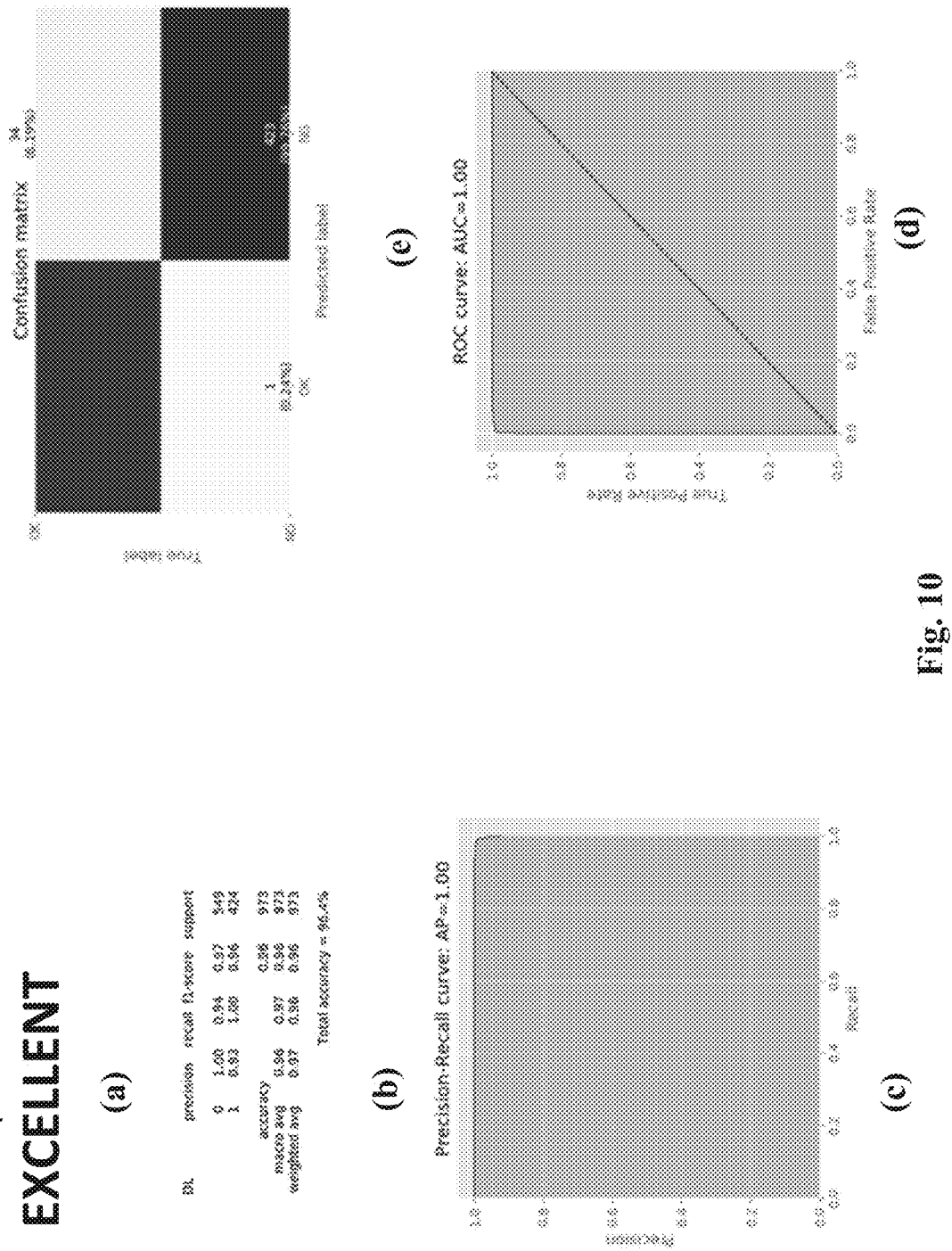
FIG. 10 illustrates an example overall performance report, in accordance with another embodiment of the present disclosure.

FIG. 10 illustrates an example overall performance report, in accordance with another embodiment of the present disclosure. The performance-report comprises contribution from each of modules 304 until 310 and 314 and refers a statistical report based on metrics defined by one or more of: accuracy, recall, precision, computation time and any function based upon a combination thereof. Such report may be referred to detect an underperforming or high resource consuming entity from amongst the first model, second model, feature extractor and the one or more selected classifier.

In an example, FIG. 10(a) refers a Model overall rating "Excellent" for a deep learning model having the title as "Exclude DL". FIG. 10(b) refers a Precision, recall, f1 score and so on. FIG. 10(c) refers a "Precision Recall curve and FIG. 10(d) refers a receiver operating characteristic curve. FIG. 10(e) refers a Confusion Matrix to depict as to which class is mis-classified.

FIG. 11 illustrates another example overall performance report analogous to FIG. 10, in accordance with another embodiment of the present disclosure.

In an example, FIG. 11(a) refers a Model overall rating "POOR" for a deep learning model having the title as "VAI_V7_1". FIG. 11(b) refers a Precision, recall, f1 score and so on. FIG. 11(c) refers a "Precision Recall curve and FIG. 11(d) refers a receiver operating characteristic curve. FIG. 11(e) refers a Confusion Matrix to depict as to which class is mis-classified. FIG. 11(f) refers a recommendation from Meta Controller 312 that selected ROI are not appropriate. Accordingly, the MetaController 312 refers back to the individual component reports (i.e. the ROI module 308 report) to recommend an action.

Figure 12:
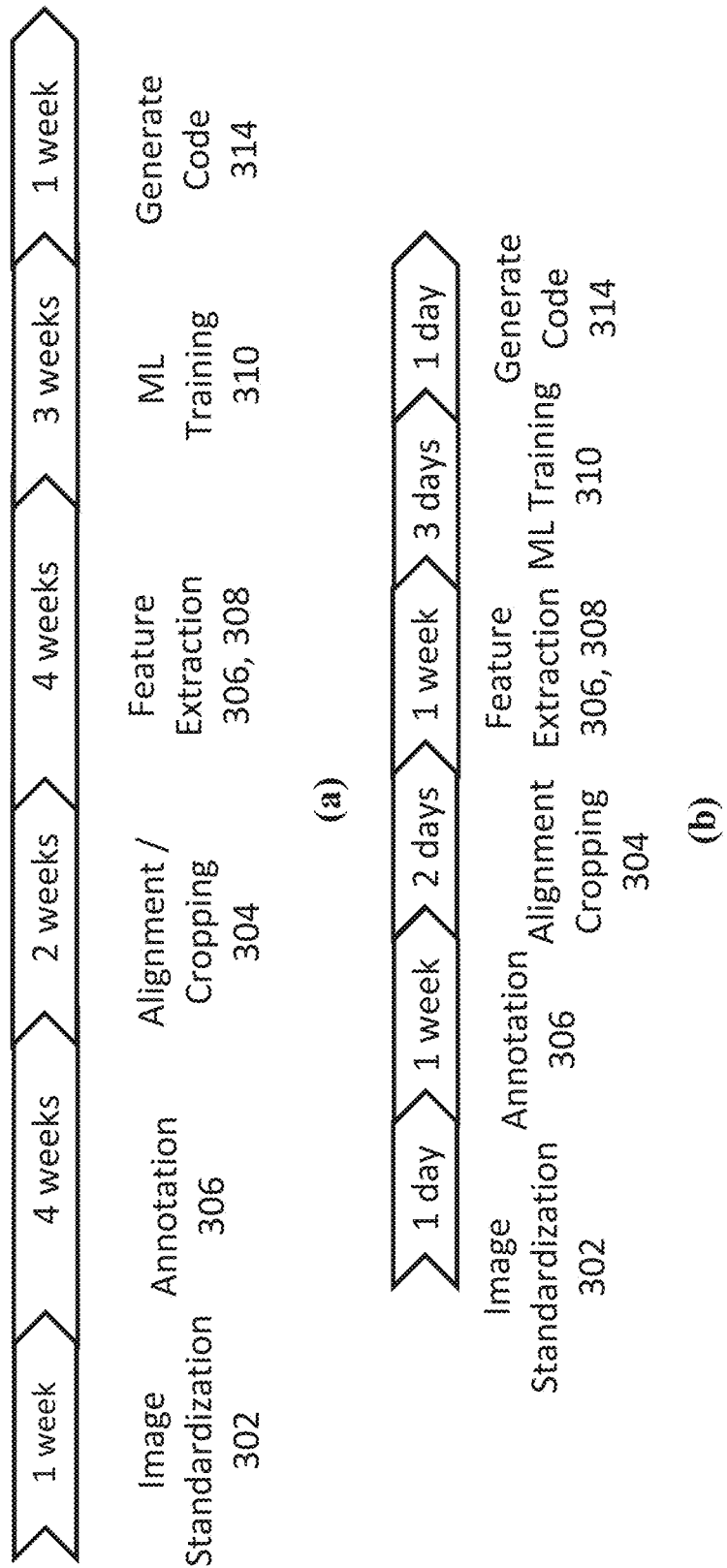
FIG. 12 illustrates a comparative analysis of the present disclosure with respect to the state of the art.

FIG. 12 illustrates a comparative analysis of the present disclosure with respect to the state of the art.

FIG. 12(a) represents total time to develop AI algorithm in conventional way wherein a normally elapsed timeline is 2 months without annotation and 3 months with annotation. On other hand, FIG. 12(b) depicts a timeline to develop AI algorithm in accordance with the present subject matter as 2 weeks without annotation and 3 weeks with annotation.

FIG. 12(b) accordingly refers accelerating the development-time, and enables a quick disengagement of deputed manpower and opens up the bandwidth to accommodate further projects such as AI inspection project by the now free manpower, thereby doing away with constraints associated with manpower resources.

In addition, the GUIs forming a part of each of the module 302 until 413 render a toolbox arrangement which may be hosted online as a web or cloud computing based application to invite participation of external parties in the development work. In another example, the present toolbox may be simply rendered as web based service for online subscription, e.g, through licensing of software (e.g. SaaS).

Figure 13:
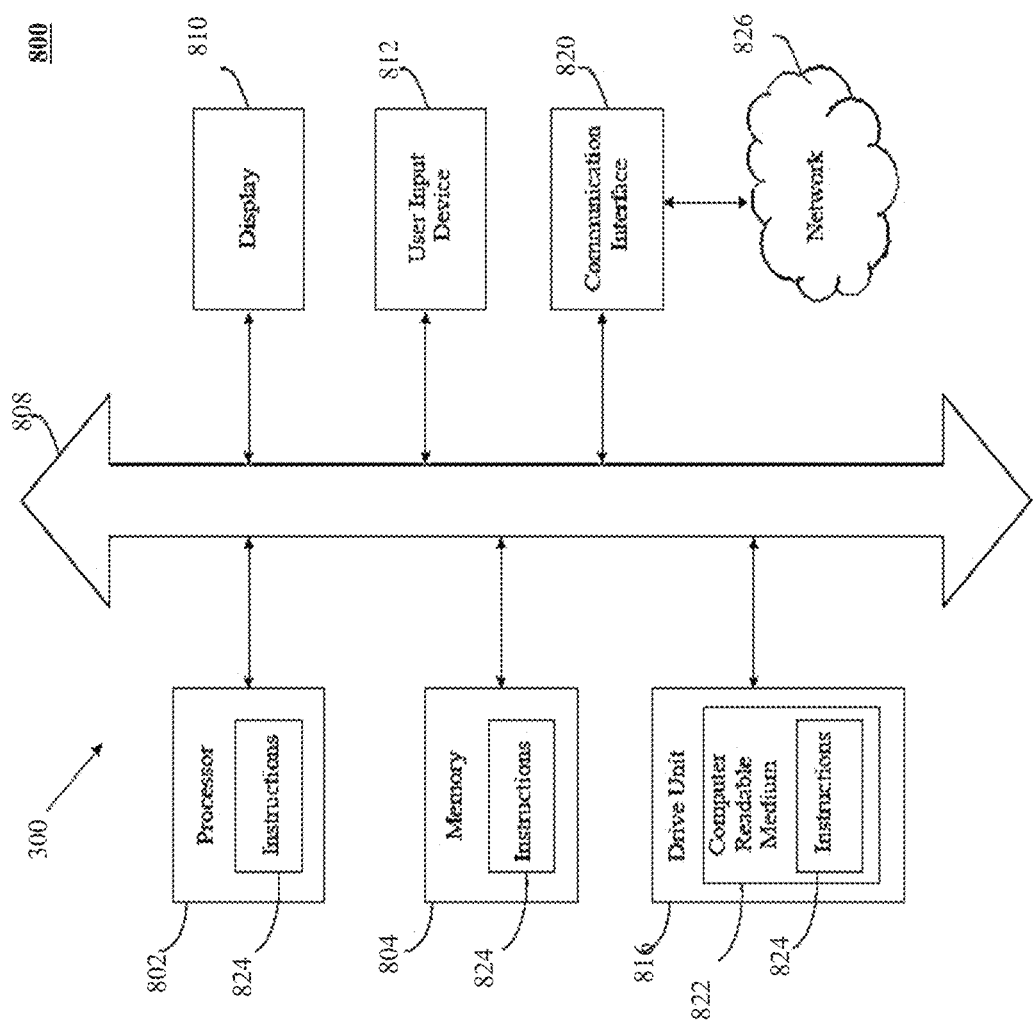
FIG. 13 illustrates an implementation of the system as illustrated in preceding figures in a computing environment, in accordance with another embodiment of the present disclosure.

FIG. 13 illustrates an implementation of the system 300 as illustrated in FIG. 3 in a computing environment. The present figure essentially illustrates the hardware configuration of the system 300 in the form of a computer system 300 is shown. The computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 (e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data The processor 802 may implement a software program, such as code generated manually (i.e., programmed).

The computer system 800 may include a memory 804, such as a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the computer system 800.

The computer system 800 may also include a disk or optical drive unit 816. The disk drive unit 816 may include a computer-readable medium 822 in which one or more sets of instructions 824. e.g. software, can be embedded. Further, the instructions 824 may embody one or more of the methods or logic as described. In a particular example, the instructions 824 may reside completely, or at least partially, within the memory 804 or within the processor 802 during execution by the computer system 800. The memory 804 and the processor 802 also may include computer-readable media as discussed above.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800 or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 800.

At least based on the aforesaid features, the present subject matter renders a centralized mechanism to orchestrate the flow of the overall interaction. The same at least facilitates generating the A/B testing procedure to test different options and automatically run it in batch mode. Further, the centralized mechanism analyses the performance reports and propose improvements to the user.

In an example, the centralized mechanism may be appropriated for visual inspection mechanism involving a generic method for 2D image alignment for visual inspection tasks. The method can be used for any type and shape of objects. In an example, the method is based on minimally-supervised learning. In an example, an automatic method in accordance with the present subject matter proposes very few (for instance 1-10) representative images for landmark annotation to the user. A deep learning based method may be used to align other similar images based on the landmarks annotated by the human operator. Overall, the present subject matter expedites an overall development time for AI driven visual inspection process.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"): the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A method for developing machine-learning (ML) based tool for visual inspection, the method comprising:
   initializing a visual inspection process based on one or more selected images defining a dataset;
   aligning, using a first model to be implemented in the ML based tool, one or more detected objects within an image-frame of at least one selected image of the one or more selected images of at least selected one image of the one or more selected images to generate at least one aligned image of the at least one selected image and to train the ML based tool using the generated at least one aligned image;
   generating a first model statistical report of a performance of the first model based on metrics defined by one or more of: any combination of accuracy, recall, precision, computation time, and any function of the first model;
   extracting, using a feature extractor to be implemented in the ML based tool, a plurality of features from the at least one aligned image;
   generating a feature extractor statistical report of a performance of the feature extractor based on metrics defined by one or more of: any combination of accuracy, recall, precision, computation time, and any function of the feature extractor;
   receiving, via an ML training module to be implemented in the ML based tool, a selection of a machine-learning classifier to operate upon the extracted features and classify the at least one selected image using one or more labels pre-defined under a visual inspection;
   generating a machine-learning classifier statistical report of a performance of the machine-learning classifier based on metrics defined by one or more of: any combination of accuracy, recall, precision, computation time, and any function of the machine-learning classifier;
   assessing, via a metacontroller, the performances of the first model, the feature extractor, and the selected machine-learning classifier based on the generated first model statistical report, the generated feature extractor statistical report, and the generated machine-learning classifier statistical report;
   determining, using a result from the assessment, whether one or more underperforming or high resource consuming entities exist amongst the first model, the feature extractor, and the selected machine-learning classifier;
   in response to determining that the one or more underperforming or high resource consuming entities exist amongst the first model, the feature extractor, and the selected machine-learning classifier, i) performing an automatic corrective action or a user-defined corrective action to the one or more underperformance or high resource consumption entities and ii) generating first codes to create the ML based tool in which the one or more underperformance or high resource consumption entities to which the automatic corrective action or the user-defined corrective action is performed are implemented; and
   in response to determining that the one or more underperforming or high resource consuming entities do not exist amongst the first model, the feature extractor, and the selected machine-learning classifier, generating a second codes, different from the first codes, to create the ML based tool in which the first model, the feature extractor, and the selected machine-learning classifier are implemented.

2. The method as claimed in claim 1, wherein the first codes and the second codes are at least one type of AI code for deployment on-field to execute a machine-learning driven based inference process for visual inspection, the AI code having been generated upon assessment of the performance.

3. The method as claimed in claim 1, further comprising:
   defining, using a second model, a region of interest (ROI) with respect to the at least one aligned image, the ROI being automatically selected or manually selected;
   extracting, using the feature extractor, a plurality of features from the ROI in the at least one aligned image and providing a feature-vector of the extracted features of the ROI to the ML training module; and
   assessing a performance of the second model by generating a second model statistic report based on evaluating the selection of the ROI.

4. The method as claimed in claim 1, wherein said initialization comprises operating upon a GUI by a user for receiving high level inputs defined by one or more of a path to dataset, data labelling, classes, a type of problems to be solved through the visual inspection.

5. The method as claimed in claim 1, wherein the alignment through the first model comprises modifying a position of the detected object of the image within the image-frame, said alignment defined by one or more of:
   a GUI based operation for rendering a semi-automated alignment process;
   a user-operable tool for a manual image-alignment; and
   an auto-alignment tool.

6. The method as claimed in claim 5, further comprising:
   receiving, via a GUI based annotation tool, one or more of a user-defined or automatically defined annotation for the at least one aligned image or the at least one selected image, said GUI based annotation tool defined by:
   a first area for depicting a labelled data set through a dendrogram with respect to the aligned images; and a second area comprising a plurality of controls associated with approving and/or relabeling the labelled set; and
annotating the at least one aligned image or the at least one selected image.

7. The method as claimed in claim 1, wherein the receiving of the selection of the machine-learning classifier through the ML training module further comprises selecting the machine-learning classifier and/or optionally a cross validation method based on a user input received through a GUI forming a part of the ML training module.

8. The method as claimed in claim 1, wherein the assessment of the performances of the first model, the feature extractor, and the ML training module by the metacontroller further comprises:
performing an automatic or semi-automatic A/B testing based on observing a change in configuration of a pipeline in the ML based tool having stages as one or more of the first model, a second model, the feature extractor, and the ML training module.

9. The method as claimed in claim 8, wherein the assessment by the metacontroller is defined by:
triggering the one or more of said stages in the pipeline to share respective operation details;
based on received operation details, executing at least one of:
rendering a diagnostic tool to check malfunctioning at every stage in the pipeline; and
enabling the automatic or semi-automatic A/B testing in batch mode by allowing a selection amongst various operational parameters at every stage in the pipeline.

10. A system for developing machine-learning (ML) based tool for visual inspection, the system comprising:
an initialization module for initializing a visual inspection process based on one or more selected images defining a dataset;
an alignment model aligning one or more detected objects within an image-frame of at least one selected image of the one or more selected images of at least selected one image of the one or more selected images to generate at least one aligned image of the at least one selected image and to train the ML based tool using the generated at least one aligned image;
a feature extractor for extracting a plurality of features from the at least one aligned image;
an ML training module for receiving a selection of a machine-learning classifier to operate upon the extracted features and classify the at least one selected image using one or more labels pre-defined under a visual inspection; and
a metacontroller for communicating with one or more of the alignment model, the feature extractor and the ML training module for assessing one or more of:
a performance of at least one of first model and the feature extractor;
a comparison of operation among the one or more selected machine-learning classifiers; and
diagnosis of an unexpected operation with respect to one or more of the first model, the feature extractor and the selected machine-learning classifier,
wherein the metacontroller performs an automatic or semi-automatic A/B testing based on observing a change in configuration of a pipeline having stages as one or more of the first model, second model, feature extractor and the ML training module.

11. The system as claimed in claim 10, further comprising:
a code generator for generating at least one type of AI code for deployment on-field to execute a machine-learning driven based inference process for visual inspection, said code having been generated upon assessment of the performance.

12. The system as claimed in claim 10, further comprising an ROI selector module for
defining a region of interest (ROI) with respect to the at leas one aligned image, said ROI being automatically selected or manually selected;
extracting a plurality of features with respect to the ROI in the at least one aligned image through the feature extractor for providing a feature-vector for the ML training module; and
enabling the assessment of performance and diagnosis with respect to the selection of the ROI.

13. The system as claimed in claim 10, wherein the alignment model is configured to:
modifying a position of the detected object of the image within an image-frame, said alignment defined by one or more of:
a GUI based operation for rendering a semi-automated alignment process;
a user-operable tool for a manual image-alignment; and
an auto-alignment tool.

14. The system as claimed in claim 10, further comprising a GUI based annotation tool configured for:
receiving one or more of a user-defined or automatically defined annotation through a GUI based annotation tool in respect of the aligned images, said GUI based annotation tool defined by:
a first area for depicting a labelled data set through a dendrogram with respect to the aligned images;
a second area comprising a plurality of controls associated with approving and/or relabeling the labelled set.

15. The system as claimed in claim 10, wherein the metacontroller is configured for:
generating a statistical-report for each of first model, second model, feature extractor and the one or more selected machine-learning classifier, said statistical report based on metrics defined by one or more of: accuracy, recall, precision, computation time and any function based upon a combination thereof;
referring said report to detect an underperforming or high resource consuming entity from amongst the first model, second model, feature extractor and the one or more selected machine-learning classifiers; and
troubleshooting the malfunctioning or underperformance caused due to said detected entity by prompting an automatic or user-defined corrective action.

16. The system as claimed in claim 10, wherein the assessment by the metacontroller is defined by:
triggering the one or more of said stages in the pipeline to share respective operation details;
based on received operation details, executing at least one of
rendering a diagnostic tool to check malfunctioning at every stage in the pipeline; and
enabling the automatic or semi-automatic A/B testing in batch mode by allowing a selection amongst various operational parameters at every stage in the pipeline.

* * * * *